United States Patent Office 3,347,927
Patented Oct. 17, 1967

3,347,927
16-KETO-17α-HYDROXY-A-NOR PROGESTERONE AND INTERMEDIATES FOR THE PREPARATION THEREOF
Saul L. Neidleman, Lawrence Township, Samuel C. Pan, Metuchen, and Patrick A. Diassi, Westfield, N.J., assignors, by mesne assignments, to E. R. Squibb & Sons, Inc., New York, N.Y., a corporation of Delaware
No Drawing. Original application Mar. 26, 1965, Ser. No. 443,080. Divided and this application Dec. 19, 1966, Ser. No. 602,476
2 Claims. (Cl. 260—586)

ABSTRACT OF THE DISCLOSURE

This invention relates to new 17α-hydroxy-16,20-diketo steroids of the pregnane series and, more particularly, to the compounds: 16-keto-17α-hydroxyprogesterone, 16-keto-17α-hydroxy-A-norprogesterone and A-norpregna-3-en-2,16,20-trione. These new steroids possess progestational activity.

This application is a division of our application, Serial No. 443,080, filed March 26, 1965, now U.S. Patent No. 3,316,156 which in turn is a continuation-in-part of our application, Serial No. 425,077, filed January 12, 1965, and now abandoned.

This invention relates to a new process for preparing 17α-hydroxy-16,20-diketo steroids and to certain new steroids prepared thereby.

The process of this invention essentially comprises subjecting a 16,20-diketo steroid of the pregnane series (including the pregnene, pregnadiene and pregnatriene series), unsubstituted in the 17-position, under aerobic conditions to the action of the enzyme peroxidase in the presence of hydrogen peroxide.

As sources of the peroxidase enzyme, plant cells and saps, animal tissues (such as liver), body fluids (such as saliva), leucocytes (myeloperoxidase), milk (lactoperoxidase) and many microorganisms, such as *Xylaria digitata* and *Curvularia lunata*, may be used. The preferred sources of peroxidase for the purpose of this invention are horse-radish and the microorganism, *Myrothecium verrucaria*. The peroxidase obtained from the horse-radish can be supplied merely by pressing horse-radish and using the juice obtained or a purified preparation of horse-radish peroxidase may be used. The peroxidase from *M. verrucaria* can be obtained by culturing the microorganism on a suitable nutrient medium, recovering the mycelium formed and treating the mycelium to recover purified peroxidase.

In addition to the peroxidase, hydrogen peroxide must also be present in the reaction mixture. Although hydrogen peroxide itself may be added to the mixture, preferably the hydrogen peroxide is prepared in situ by use of a peroxide producing enzyme system. Such enzyme systems are well known in the art and include glucose oxidase in the presence of glucose, D- and L-amino acid oxidases in the presence of D- or L-methionine, and diamine oxidase in the presence of histamine. Although substantially any concentration of hydrogen peroxide may be used, preferably the hydrogen peroxide is present in a molar ratio of about 0.1 to 1 to about 100 to 1 (optimally about 1 to 1 to about 10 to 1) based on the weight of the steroid. If a peroxide producing enzyme system is used, the concentration of the enzyme is so adjusted to yield the same concentration of hydrogen peroxide as stated above.

The reaction is preferably conducted at a pH in the range of about 4 to about 7 (optimally about 6 to about 7 and most advantageously at a pH of about 6). To assure that the pH of the reaction mixture is maintained in this range, a buffering agent which buffers in the desired pH range is preferably also added to the reaction medium. Suitable buffers include McIlvaine's buffer, potassium citrate buffer, potassium acetate buffer, potassium phosphate buffer and potassium formate buffer.

The reaction is carried out in an aqueous medium under aerobic conditions, normally at a temperature in the range of about 20° C. to about 30° C. The components of the medium, namely, the steroid, buffering agent, peroxidase and hydrogen peroxide source are merely mixed with water and the resultant mixture agitated or shaken to assure adequate aeration for about 10 to about 300 minutes (optimally about 30 minutes to about 240 minutes).

Although the peroxidase acts merely as a catalyst and hence can be present in any proportion, to assure maximum conversion of the starting steroid to the desired final product, the peroxidase is present in a weight ratio of about 1 to about 10 optimally about 2.0) based on the steroid reactant.

Among the suitable steroid substrates are all steroids of the pregnane series that are unsubstituted in the 17-position and contain keto groups in at least the 16 and 20-positions. Such steroids include 16-ketoprogesterones, 16-keto-A-norprogesterone 16 - keto - 1 - dehydroprogesterone, 16-keto-6-dehydroprogesterone, 16-keto-1,6-tetradehydroprogesterone, 16 - ketopregnenolone, 16-keto-11-desoxycorticosterone and 21-esters thereof, 6α-methyl-16-ketoprogesterone, 6β-chloro-16 - ketoprogesterone, 6α-fluoro-16-ketoprogesterone, 9α-halo-11β-hydroxy-16-ketoprogesterones (such as 9α-fluoro-11β-hydroxy-16-ketoprogesterone), 9α-halo-11,16 - diketoprogesterones, 9α-halo-11β-hydroxy-16 - keto-1 - dehydroprogesterones, 9α-halo-11β-hydroxy-16-keto-6-dehydroprogesterones, 6α,9α-dihalo-11β-hydroxy - 16 - ketoprogesterones, 9α-halo-16-keto-corticosterones and 21-esters thereof (such as 9α-fluoro-16-ketocorticosterone and its 21-acetate), 9α-halo-16-keto-1-dehydrocorticosterones and 21-esters thereof (such as 9α-fluoro-16-keto-1-dehydrocorticosterone and its 21-acetate), 9α-halo-16-keto-6-dehydrocorticosterones and 21-esters thereof, 9α,21-dihalo-11β-hydroxy-16-ketoprogesterones, 9α,21 - dihalo-11β-hydroxy-16-keto-1-dehydroprogesterones, 9α,21-dihalo-11β-hydroxy-16-keto-6-dehydroprogesterones, 9α-halo-11β - hydroxy-16-keto-A-norprogesterones, 16-keto-19 - norprogesterone, 16-keto-19-norcorticosterone, 6α - halo-16-keto-11β-hydroxycorticosterones and their 21-esters, and 6α-halo-16-keto-11β-hydroxy-1-dehydrocorticosterones and their 21-esters.

The products obtained correspond to the steroid substrate but contain a 17α-hydroxy group. Thus, for example, by employing 16-ketoprogesterone as the substrate, 16-keto-17α-hydroxyprogesterone, a new steroid of this invention having progestational activity and hence useful in lieu of progesterone in treatment of conditions for which progesterone is used, is obtained. The other new 17α-hydroxy steroids formed possess glucocorticoid activity if they contain a 11β-hydroxy or 11-keto group, and progestational activity if there is no substitution in the C-ring.

The following examples illustrate the invention:

EXAMPLE 1

*16-keto-17α-hydroxyprogesterone*

To each of one hundred 1" x 6" tubes are added 24 mg. of glucose in 2 ml. of water, 30 mg. of glucose oxidase (Cal. Biochem. No. 34641, 1.6 Eu/mg. protein) in 2 ml. of water, 10 mg. of horse-radish peroxidase (Worthington, Grade D) in 2 ml. of water, 2 ml. of 0.5 M potassium phosphate buffer (pH 6.0), 5 mg. of 16-ketoprogesterone in 0.4 ml. of dimethylsulfoxide and 1.6 ml. of distilled water and the tubes attached to a rotary shaker at 25° C. for five hours. The contents of tubes are pooled and extracted twice with one liter of methyl isobutyl ketone. The combined organic phases are then extracted with water, 5% sodium bicarbonate and water and evaporated to dryness, in vacuo. The residue (about 977 mg.) is dissolved in five milliliters of chloroform and the solution applied in equal quantities to twenty five sheets of Whatman 3 mm. paper (7.5" wide) and chromatographed using the system toluene-propylene glycol with propylene glycol as the stationary phase and toluene as the mobile phase. The bands at Rf≈0.6 which are detectable under ultraviolet light are cut and eluted with methanol. The methanol extracts are then evaporated to dryness and the residue taken up in chloroform which is washed with water and evaporated to dryness, in vacuo. Crystallization of the residue from acetone-hexane gives about 114.3 mg. of 16-keto-17α-hydroxyprogesterone having a melting point about 182–184° C., $[\alpha]_D^{25}$—90.7° (chloroform), $\lambda_{max.}^{alc.}$ 239 mµ (ε, 18,700), $\lambda_{max.}^{CDCl_3}$ 3450, 1756, 1798, 1681 cm.$^{-1}$, $\tau_{CDCl_3}^{Si(CH_3)_4}$ 4.25 (s, 4-H), 7.73 (s, 21-Me), 8.98 (s, 19-Me), 9.01 (s, 18-Me).

*Analysis.*—Calc'd for $C_{21}H_{28}O_4$ (344.44): C, 73.22; H, 8.19. Found: C, 72.99; H, 8.24.

EXAMPLE 2

Following the procedure of Example 1 but substituting the same quantity of L-amino acid oxidase for the glucose oxidase and the same quantity of L-methionine for the glucose, the same product, 16-keto-17α-hydroxyprogesterone, is obtained.

EXAMPLE 3

Following the procedure of Example 1 but substituting the same quantity of diamine oxidase for the glucose oxidase and the same quantity of histamine for the glucose, the same product, 16-keto-17α-hydroxyprogesterone, is obtained.

EXAMPLE 4

*16-keto-17α-hydroxy-A-norprogesterone*

(a) *Preparation of A-norpregn-3-en-2,16,20-trione.*—To a solution of 600 mg. of 16α-hydroxy-A-norprogesterone in 150 ml. of reagent grade acetone, 8 ml. of an acetone-water (9:1, v:v) solution containing 20 mg. of CrO$_3$ and 32 mg. of sulfuric acid per milliliter are added dropwise with stirring. After 10 minutes a few drops of methanol are added, the mixture diluted with water and partially evaporated in vacuo. It is then extracted with chloroform which is washed with water, dried over sodium sulfate and evaporated to dryness. Crystallization of the residue from acetone-hexane or ether gives about 400 mg. of A-norpregn-3-en-2,16-20-trione having a melting point of about 128–130°, $[\alpha]_D^{24}$—44° (chloroform), $\lambda_{max.}^{alc.}$ 233 mµ (ε, 18,500), 286 mµ (ε, 6200).

*Analysis.*—Calc'd for $C_{20}H_{26}O_3$ (314.41): C, 76.40; H, 8.34. Found: C, 76.53; H, 8.31.

(b) *Preparation of 16-keto-17α-hydroxy-A-norprogesterone.*—Following the procedure of Example 1 but substituting 5 mg. of A-norpregn-3-en-2,16,20-trione for the 16-ketoprogesterone, 16-keto-17α-hydroxy-A-norprogesterone having a melting point of about 190–192°, $\lambda_{max.}^{alc.}$ 232 mµ (ε, 19,800), is obtained.

*Analysis.*—Calc'd for $C_{20}H_{26}O_4$ (330.41): C, 72.70; H, 7.93. Found: C, 72.77; H, 7.79.

Similarly, any other 17-unsubstituted-16,20-diketo steroid of the pregnane series may be substituted for the 16-ketoprogesterone in the procedure of Example 1 to yield the corresponding 17α-hydroxy-16-20-diketo derivative as the product obtained.

This invention may be variously otherwise embodied within the scope of the appended claims.

What is claimed is:

1. The compound having the name 16-keto-17α-hydroxy-A-norprogesterone.
2. The compound having the name A-norpregn-3-en-2,16,20-trione.

References Cited

UNITED STATES PATENTS

| | | | |
|---|---|---|---|
| 2,897,219 | 7/1959 | Wettstein et al. | 260—397.47 |
| 2,942,012 | 6/1960 | Taub et al. | 260—397.45 |

ELBERT L. ROBERTS, *Primary Examiner.*